United States Patent
Gold et al.

[11] Patent Number: 5,997,005
[45] Date of Patent: Dec. 7, 1999

[54] HUB SEAL WITH MACHINABLE THRUST RING

[75] Inventors: Mark N. Gold, Hallsville; Laurence B. Winn, Longview, both of Tex.

[73] Assignee: Stemco Inc, Longview, Tex.

[21] Appl. No.: 08/957,807

[22] Filed: Oct. 24, 1997

[51] Int. Cl.[6] .............................. F16J 15/34; F16J 15/32
[52] U.S. Cl. ..................... 277/402; 277/571; 277/565; 384/486
[58] Field of Search ..................... 277/402, 403, 277/550, 551, 571, 415, 527, 565, 572; 384/482, 481, 486, 485

[56] References Cited

U.S. PATENT DOCUMENTS

| | | | |
|---|---|---|---|
| 3,021,161 | 2/1962 | Rhoads et al. | 277/571 X |
| 3,135,518 | 6/1964 | Carson et al. | 277/531 |
| 3,341,265 | 9/1967 | Paterson | 384/486 |
| 3,472,254 | 10/1969 | Reed, Jr. et al. | 137/72 |
| 3,527,512 | 9/1970 | Miller | 384/482 |
| 3,685,841 | 8/1972 | Keller | 277/571 |
| 4,083,567 | 4/1978 | Thumm | 277/551 X |
| 4,208,057 | 6/1980 | Messenger | 277/309 |
| 4,226,426 | 10/1980 | Messenger | 277/551 X |
| 4,252,329 | 2/1981 | Messenger | 277/551 |
| 4,413,831 | 11/1983 | Washida et al. | 277/386 |
| 5,004,248 | 4/1991 | Messenger et al. | 277/351 |
| 5,015,001 | 5/1991 | Jay | 277/551 |

*Primary Examiner*—Anthony Knight
*Attorney, Agent, or Firm*—Cummings & Lockwood

[57] ABSTRACT

A hub seal for installation on the wheel end of a heavy duty trailer or truck is disclosed which includes an annular casing defining a radially outer circumferential canal, a thrust ring defined by a ring of polymeric material disposed within the circumferential canal, and an annular sleeve mounted coaxial with the annular casing. The annular sleeve includes a deflector ring configured to mechanically remove at least a portion of the thrust ring upon relative rotation of the casing and sleeve to create a minimal running clearance between the deflector ring and the thrust ring. A method of fabricating a hub seal having a machinable thrust ring is also disclosed.

21 Claims, 4 Drawing Sheets

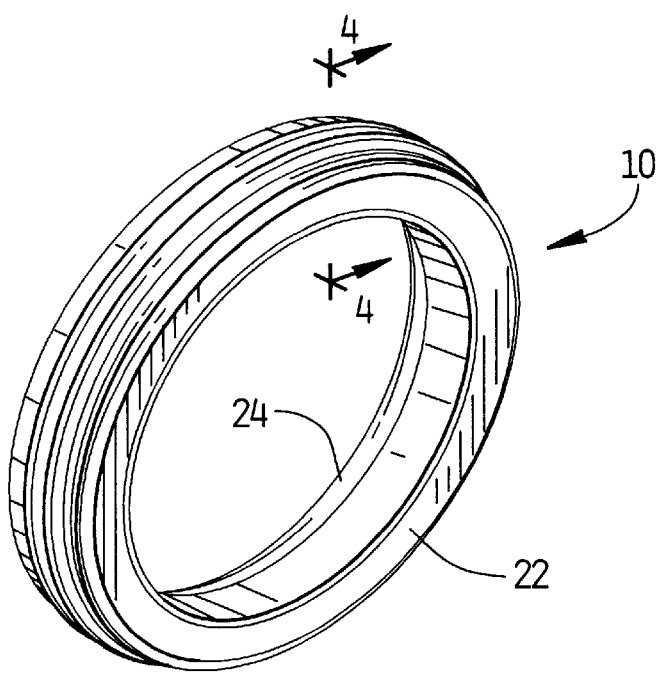
FIG_1
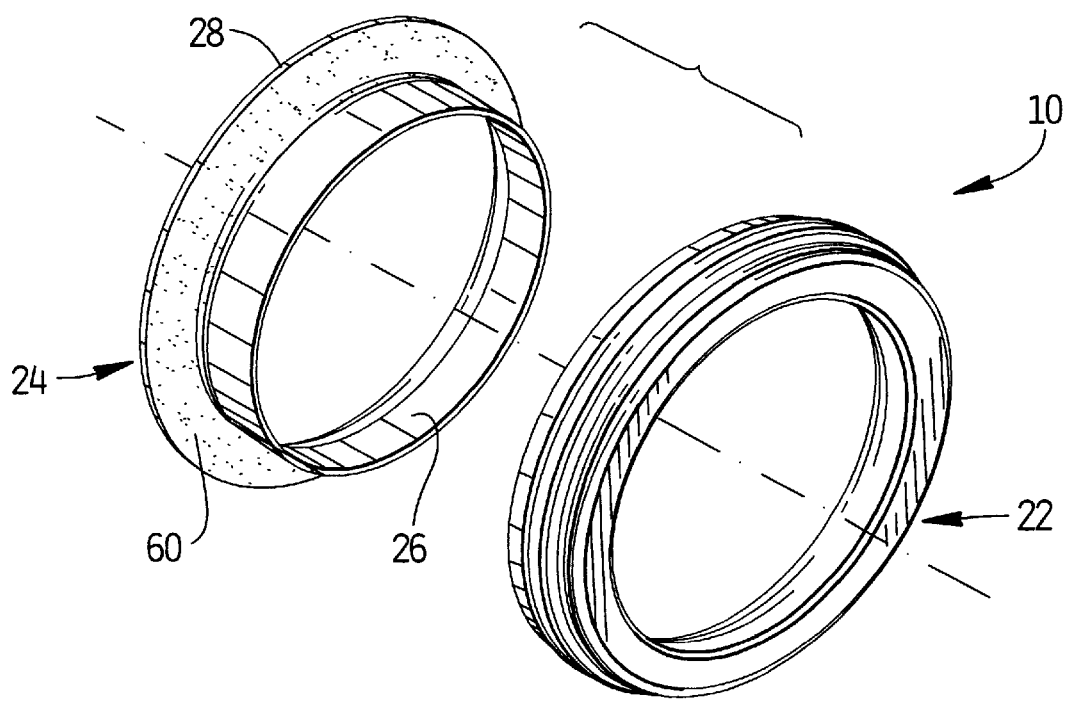
FIG_2

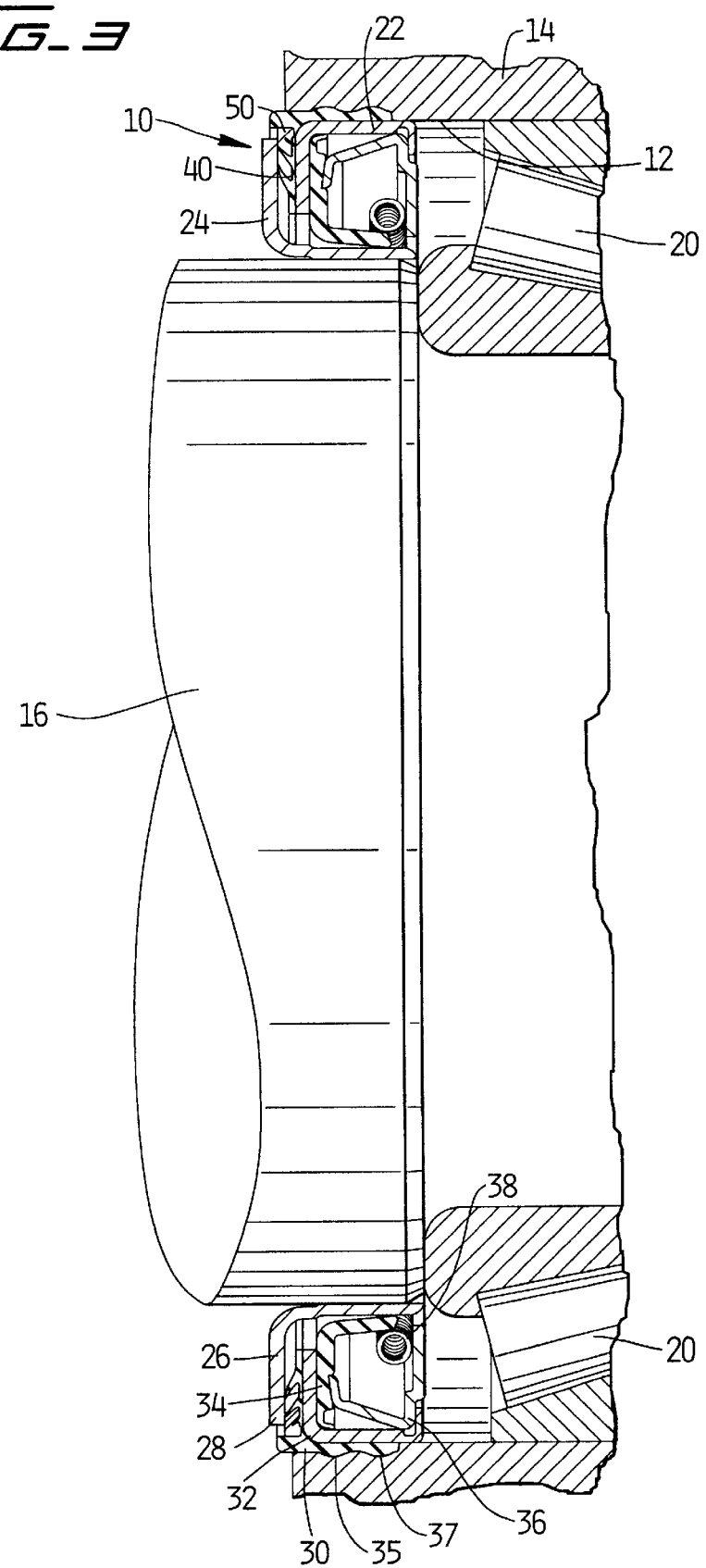
FIG_3

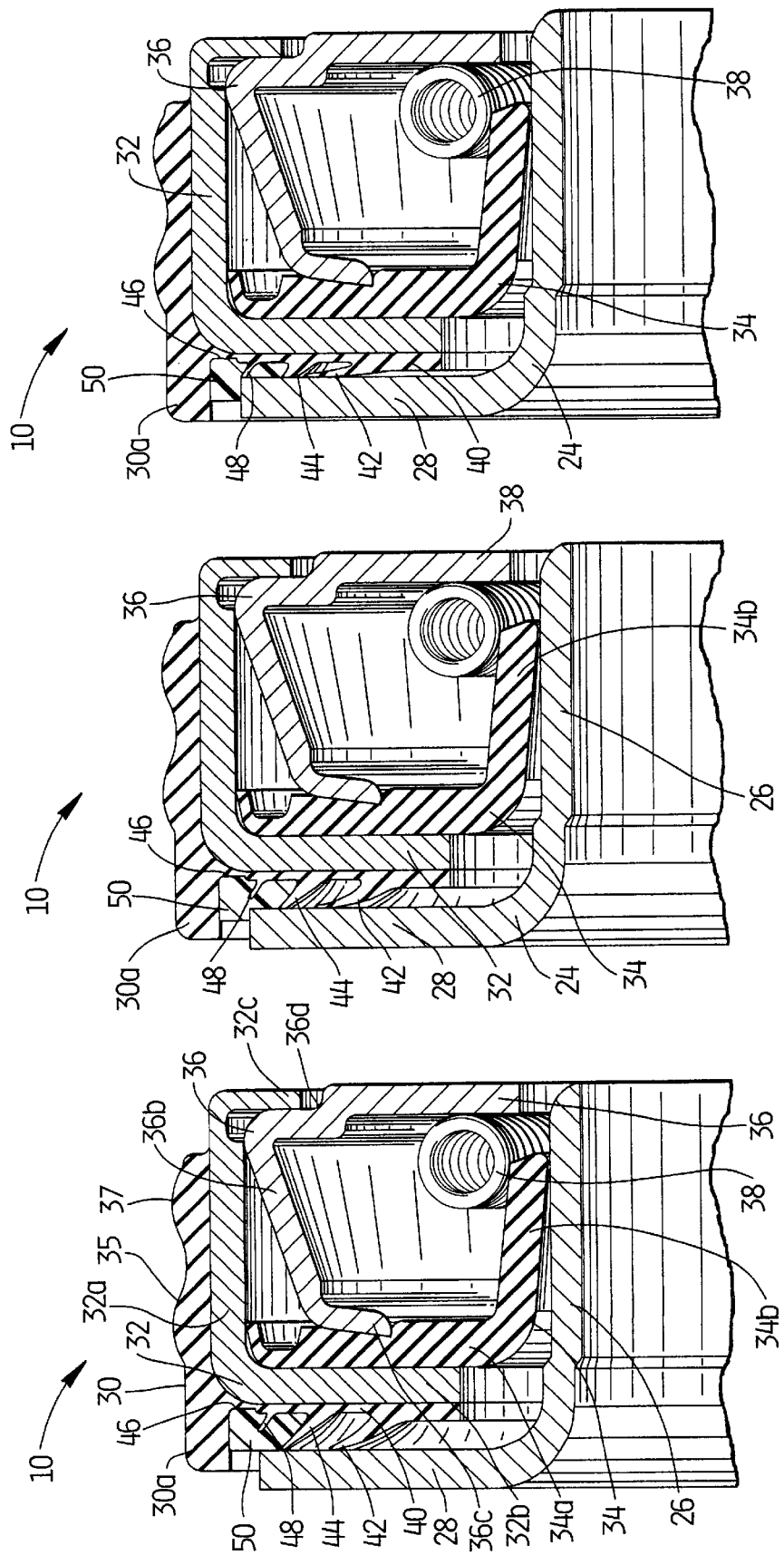

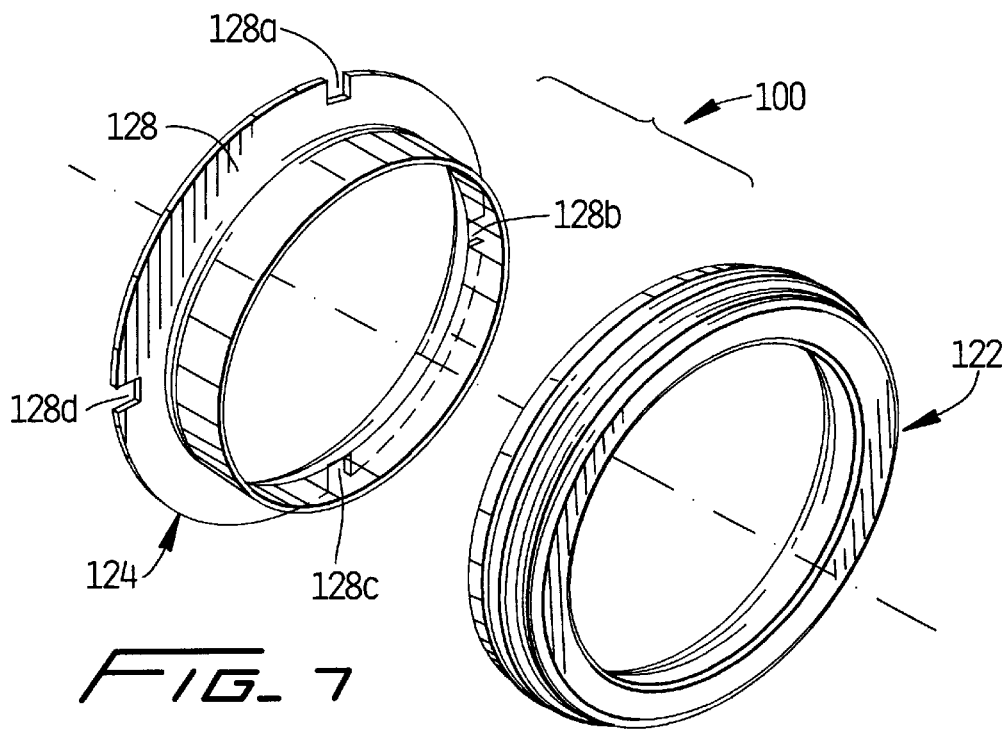
FIG_7
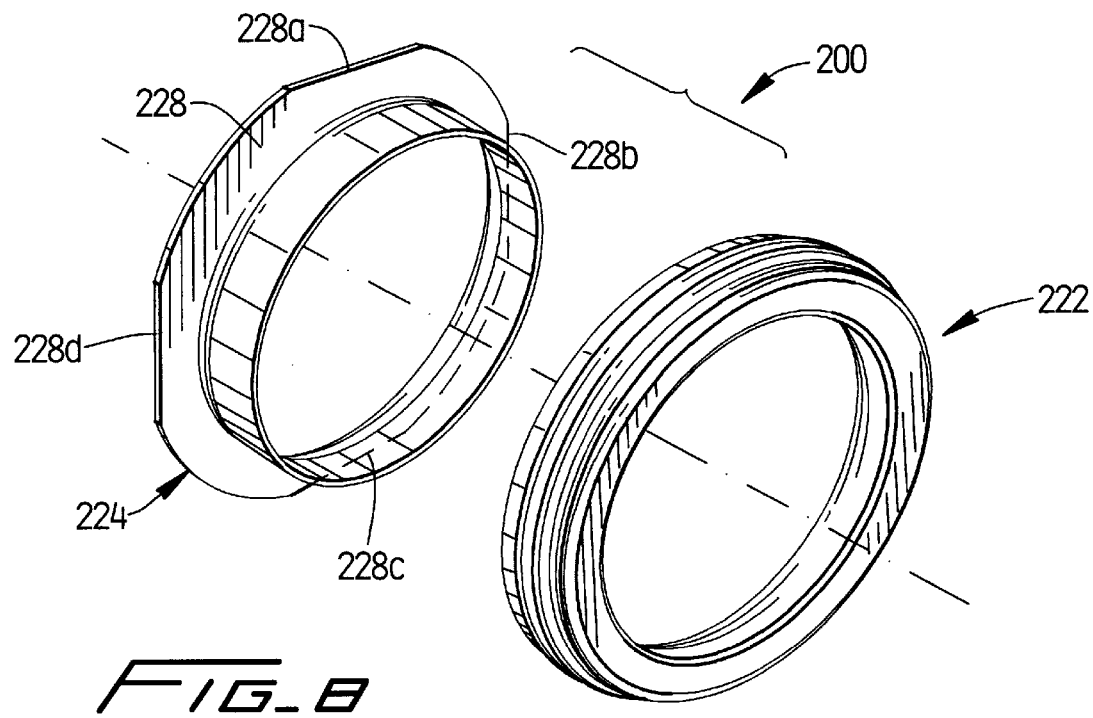
FIG_8

HUB SEAL WITH MACHINABLE THRUST RING

BACKGROUND OF THE INVENTION

1. Field of the Invention

The subject invention relates to a hub seal, and more particularly, to a hub seal having a machinable thrust ring which reacts to axial loads imposed during installation of the hub seal on the wheel end of a vehicle, and which is partially removed through shearing action during the break-in period of the seal.

2. Background of the Related Art

In tractor and trailer wheel end axle assemblies, particularly those employed on large trailers, semi-trailers and tractors, the wheel is mounted on a fixed axle for rotation thereabout. The hub of the wheel defines a lubricant chamber about the end of the axle in association with the wheel bearings. A quantity of lubricant is maintained in the lubricant chamber to continuously bathe the bearings. A hub cap is used to enclose the lubricant chamber and a shaft seal is fit onto the axle to effect a dynamic seal between the axle and the lubricant chamber.

Shaft seals are well known in the art, and generally include a wear member or sleeve and a seal member or casing. The casing is mounted to rotate with the wheel hub relative to the sleeve member. The casing has an outer diameter which is designed to provide an interference fit with the wheel hub and the sleeve is dimensioned to be press fit onto the wheel axle. An early example of a unitized shaft seal in which the wear member and seal member are constructed as a one-piece assembly is disclosed in U.S. Pat. No. 3,685,841 to Keller. Later examples of semi-unitized shaft seals in which the wear member and seal member can be disassembled for repair and inspection are disclosed in U.S. Pat. Nos. 4,208,057 and 4,252,329 to Messenger.

It is known in the prior art, as illustrated in each of the above-identified patents, to provide the seal member with elastomeric bumper elements that serve to maintain the axial spacing of the wear member and seal member, as well as absorb the axial load exerted upon the seal member when the seal assembly is press fit onto the axle shaft. Upon installation, the bumper elements are compressed and during the initial break-in period of the seal assembly, the bumper elements are partially worn away to provide a minimal running clearance between the wear member and the seal member.

During the break-in period, the elastomeric bumper elements generate significant resistance to rotation between the sleeve and casing. This resistance generates heat and must be overcome by increasing the torque applied between the sleeve and casing. The increased heat can have an adverse affect on the integrity of the seal and the increase in torque has an adverse affect on vehicle efficiency. In addition, the particulate material worn away from the bumper elements can contaminate the bearing chamber and cause damage to the seal assembly.

U.S. Pat. No. 5,015,001 to Jay discloses a seal assembly which includes an annular bumper element formed from a fusible material which transitions via frictional heating from a solid to a liquid during the break-in period. During break-in, it can take a considerable amount of time and applied torque to sufficiently elevate the temperature of the bumper element to a induce a phase change. This can have an adverse effect on vehicle efficiency. Clearly, there is a need in the art for a hub seal of the type having a bumper element that can be removed during the break-in period without causing an increase in torque and without generating excessive heat.

SUMMARY OF THE INVENTION

The subject invention is directed to a hub seal for installation on the wheel end of a heavy duty trailer or truck which overcomes the inadequacies of prior art hub seals. The hub seal of the subject invention includes an annular casing which defines a radially outer circumferential canal at an outboard side thereof. A thrust ring defined by polymeric material is disposed within the circumferential canal and is dimensioned and configured to support axial loads imposed upon the hub seal during installation. The thrust ring is preferably defined by a continuous ring of polymeric material, although it is envisioned that the ring may be segmented or discontinuous. Those skilled in the art will readily appreciated that the adhesive characteristics of the polymeric material from which the thrust ring is formed facilitates bonding of the thrust ring into the circumferential canal. Preferably, a circumferential lip projects axially into the circumferential canal to increase the bonding surface area thereof.

The hub seal further includes an annular wear sleeve which is mounted coaxial with the annular casing. The annular sleeve includes a deflector ring coated with a releasing material to prevent bonding of the thrust ring to the deflector ring. The deflector ring is provided with means for mechanically removing at least a portion of the thrust ring upon relative rotation of the casing and sleeve so as to create a running clearance between the deflector ring and the thrust ring.

Preferably, the deflector ring includes a circumferential planar surface which extends generally parallel to the plane of the thrust ring to mechanically remove at least a portion of the thrust ring by shearing action. Alternatively, the deflector ring may include a plurality of circumferentially spaced apart tangentially extending flats formed in a radially outer portion thereof for mechanically removing at least a portion of the thrust ring. It is also envisioned that the deflector ring could include a plurality of circumferentially spaced apart radially inwardly extending notches formed in a radially outer portion thereof to mechanically remove at least a portion of the thrust ring.

In a preferred embodiment of the subject invention, a circumferential retaining lip forms a radially inner wall of the circumferential canal. This lip is angled radially outwardly to minimize running torque and direct the movement of material, mechanically removed from the thrust ring by the deflector ring, in a radially outward direction.

The subject invention is also directed to a method of fabricating a hub seal with a machinable thrust ring which includes the steps of providing an annular casing defining a circumferential canal, injecting a polymeric material into the circumferential canal to form a machinable thrust ring, providing an annular sleeve having a deflector ring configured to mechanically remove at least a portion of the thrust ring, and unitizing the annular casing and the annular sleeve so as to position the deflector ring in opposing relationship to the machinable thrust ring. Preferably, the step of injecting the polymeric material into the circumferential canal includes the step of bonding the polymeric material within the canal, and the method further includes the step of coating the deflector ring with a releasing material which prevents bonding of the thrust ring to the deflector ring.

These and other features of the hub seal of the subject invention and the method of fabrication of the hub seal of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the subject invention appertains will more readily understand how to make and use the hub seal of the subject invention, preferred embodiments of the sealing device will be described in detail hereinbelow with reference to the drawings wherein:

FIG. 1 is a perspective view of a hub seal constructed in accordance with a preferred embodiment of the subject invention;

FIG. 2 is an exploded perspective view of a hub seal constructed in accordance with a preferred embodiment of the subject invention, wherein the deflector ring has a planar surface for machining the thrust ring provided on the outboard side of the casing;

FIG. 3 is a side elevational view in cross-section of a portion of the wheel end of a vehicle with the hub seal of the subject invention sealingly mounted therein;

FIG. 4 is a side elevational view in cross-section of the hub seal of the subject invention prior to break-in wherein the thrust ring is wholly intact;

FIG. 5 is a side elevational view in cross-section of the hub seal of the subject invention shortly after break-in commences with the thrust ring partially removed;

FIG. 6 is a side elevational view in cross-section of the hub seal of the subject invention subsequent to break-in with a sufficient portion of the thrust ring removed so as to create a running clearance between the deflector ring and the thrust ring;

FIG. 7 is an exploded perspective view of yet another hub seal constructed in accordance with a preferred embodiment of the subject invention, wherein the deflector ring includes a plurality of circumferentially spaced apart radially inwardly extending notches formed in a radially outer portion thereof for machining the thrust ring; and FIG. 8 is an exploded perspective view of another hub seal constructed in accordance with a preferred embodiment of the subject invention in which the deflector ring includes a plurality of circumferentially spaced apart tangentially extending flats formed in a radially outer portion thereof for machining the thrust ring.

DETAILED DESCRIPTION OF THE PREFERRED EMBODIMENTS

Referring now in detail to the drawings wherein like reference numerals identify similar structural elements of the subject invention, there is illustrated in FIG. 1 a two-part semi-unitized shaft seal assembly constructed in accordance with a preferred embodiment of the subject invention and designated generally by reference numeral 10. As illustrated in FIG. 3, hub seal 10 is adapted and configured to provide a dynamic seal between the interior bore 12 of a wheel hub 14 and an axle shaft 16. Roller bearings 20 are disposed within wheel hub 14 for supporting the rotation of the wheel hub relative to axle shaft 16. Wheel hub 14 defines a chamber for containing a volume of lubricating fluid which continuously bathes roller bearings 20. Shaft 10 serves to seal the lubricant chamber.

Referring now to FIG. 2 in conjunction with FIG. 3, shaft seal 10 includes an outer annular casing 22 and an inner metallic wear sleeve 24. Casing 22 and wear sleeve 24 are assembled together to form a two-part, separable, semi-unitized seal assembly, as best seen in FIG. 1. Wear sleeve 24 includes an axially extending portion 26 and a radially outwardly extending portion 28. The axially extending portion 26 is dimensioned and configured to be press-fit onto the outer diameter of axle shaft 16. The radially outwardly extending flange portion 28 of wear sleeve 24 defines an annular deflector ring which opposes the outboard side of the annular outer casing 22 when the casing, and sleeve are assembled.

Referring to FIG. 3 in conjunction with FIG. 4, the outer casing 22 of shaft seal 10 includes an elastomeric radially outer hub engagement ring 30, a primary metallic reinforcing ring 32, a primary elastomeric sealing ring 34, and a secondary metallic reinforcing ring 36. The outer hub engagement ring 30 is formed with a pair of axially spaced apart circumferential compression ribs 35 and 37 which are configured to be compressed, as much as 50% of their radial height, against the surface of the interior bore 12 of wheel hub 14 during installation. The hub engagement ring 30 is bonded to the outer surface of the axially extending portion 32a of the primary reinforcing ring 32. The primary sealing ring 34 includes a radially extending portion 34a positioned against the interior surface of the radially extending portion 32b of primary reinforcing ring 32 and an axially extending portion 34b which is biased radially inwardly by an annular garter spring 38. Garter spring 38 urges the axially extending portion 34b of sealing ring 34 into sealing contact with the radially outer surface of the axially extending portion 26 of wear sleeve 24 to effect a seal therebetween.

With continuing reference to FIG. 4, the secondary reinforcing ring 36 of hub seal 10 includes a radially extending portion 36c and a radially extending lip portion 36a which are connected by an angled axially extending portion 36b. The radially extending portion 36a supports garter spring 38 in its operative position, and the radially depending lip portion 36c compresses the radially extending portion 34a of primary sealing ring 34 against the interior surface of the radially extending portion 32b of primary reinforcing ring 32. The primary reinforcing ring 32 includes a radially depending lip portion 32c which engages a radially inset land area 36d formed between the axially extending portion 36b and radially extending portion 36a of secondary reinforcing ring 36. The engagement of these two structure facilitates integration of the outer casing 22 of shaft seal 10.

An elastomeric rib structure 40, preferably formed integral with hub engagement ring 30, is bonded to the outer surface of the radially extending portion 32b of primary reinforcing ring 32. Rib structure 40 defines a flexible lip 42 configured to decrease the running torque between the deflector ring 28 and the outboard side of the casing 32 during vehicle operation. Rib structure 40 further defines a flexible retaining lip 44 delimiting the inner wall of a circumferential canal 46, the outer wall of which is delimited by an axial extension 30a of hub engagement ring 30.

A polymeric thermoplastic material, such as, for example, polypropylene, is deposited into the circumferential canal 46, preferably by means of a conventional injection process, to form a thrust ring 50 upon hardening and setting. The polymeric material which forms thrust ring 50 has adhesive characteristics which serve to effect bonding of the material to the structural surfaces defining the circumferential canal 46. In addition, an upstanding lip 48 projects into canal 46 from race structure 40 to increase the bonding surface area for the polymeric/adhesive material of thrust ring 50.

Thrust ring 50 is configured to act as a conventional spring-back bumper element to absorb the axial load exerted on shaft seal 10 when it is press-fit onto axle shaft 16 during installation. In accordance, with a preferred embodiment of the subject invention, thrust ring 50 is a machinable sacrificial structure configured to be partially sheared away during the break-in period of shaft seal 10. More particularly, the deflector ring 28 of wear sleeve 24, is configured to mechanically remove at least a portion of thrust ring 50 during break-in to create a running clearance between the deflector ring 28 and the thrust ring 50. Specifically, deflector ring 28 has a generally planar surface 28 which is initially compressed against thrust ring 50 during installation, and which, through rotation during the break-in period of the shaft seal, functions to machine away a portion of the thrust ring by shearing action.

During the break-in period, there is an initial increase in start-up torque due to the presence of the thrust ring 50. However, after only a few revolutions of the wheel hub, the torque applied to the shaft seal rapidly decreases as the thrust ring is machined away to create a running clearance. In addition, because the running clearance is created in a relatively short period of time, there is not a substantial increase in frictional heat generation in the area of the thrust ring. Moreover, during the break-in period, the temperatures at the interface between the thrust ring and the deflector ring will remain well below the melting point of the polymeric material from which the thrust ring is formed, thereby maintaining the integrity of the shaft seal.

In a preferred embodiment of the subject invention, because the material from which thrust ring 50 is formed has adhesive characteristics, which are enhanced as the temperature of the material increases, a lubricant, in the form of a releasing material, such as, for example, Krytox™ is provided on the planar machining surface of deflector ring 28, in the form of a coating designated by reference numeral 60, to prevent material parted from the thrust ring 50 from bonding with the deflector ring 28 during the break-in period (See FIG. 2). As set forth hereinabove, the radially inner wall of the circumferential canal 46 is delimited by a retaining lip 44. This structure is angled in a radially outward direction to direct the movement of material parted from thrust ring 50 in a radially outward direction, thereby preventing contamination of shaft seal 10. In addition, retaining lip 44 serves to decrease running torque in conjunction with flexible lip 42.

Referring now to FIGS. 4 through 6, there is illustrated, in sequential order, a rendering of the manner in which a portion of thrust ring 50 is mechanically removed by the deflector ring 28 when the outer casing 22 and wear sleeve 24 rotate relative to one another during the break-in period of shaft seal 10. More particularly, as illustrated in FIG. 4, during installation of the shaft seal and prior to break-in, thrust ring 50 remains wholly intact, but in a slightly compressed state in response to the forces exerted thereupon by the deflector ring during installation. At such a time, a desirable degree of spacing is maintained between the casing and the deflector ring. Then, as illustrated in FIG. 5, when break in begins, so does the mechanical removal of the thrust ring 50 by the machining surface of the deflector ring 28.

As illustrated in FIG. 6, after only a few wheel revolutions, a minimal running clearance is created between thrust ring 50 and defector ring 28, and the torque applied to the shaft seal falls to a normal running level, minimized by flexible lip 42 and retention lip 44. During the break-in period, the temperature of the shaft seal in the area of thrust ring 50 remains well below the melting point of the polymeric material from which the thrust ring is formed, thus ensuring the integrity of the shaft seal of the subject invention.

Referring now to FIGS. 7 and 8, there are illustrated two other shaft seals constructed in accordance with a preferred embodiment of the subject invention and designated generally by reference numerals 100 and 200, respectively. Shaft seal 100 includes an outer casing 122 which is constructed in the same manner as outer casing 22 of shaft seal 10. However, the wear sleeve 124 of shaft seal 100 differs from the wear sleeve 24 of shaft seal 10 in that it includes four circumferentially spaced apart radially inwardly extending notches 128a through 128d formed in a radially outer portion of the deflector ring 128, as illustrated in FIG. 7, for mechanically removing at least a portion of a machinable thrust ring provided on the outboard side of outer casing 122. Similarly, as illustrated in FIG. 8, the wear sleeve 224 of shaft seal 200 differs from the wear sleeve 24 of shaft seal 10 in that it includes four circumferentially spaced apart tangentially extending flats 228a through 228d formed in a radially outer portion of the deflector ring 128 for mechanically removing at a least a portion of a machinable thrust ring provided on the outboard side of outer casing 222.

Although the hub seal of the subject invention has been described with respect to a preferred embodiment, it is apparent that modifications and changes can be made thereto without departing from the spirit and scope of the invention as defined by the appended claims.

What is claimed is:

1. A hub seal for installation on the wheel end of a vehicle comprising:

a) an annular casing defining a radially outer circumferential canal, and including a circumferential retaining lip forming a radially inner wall of said circumferential canal;

b) a thrust ring defined by polymeric material disposed within said circumferential canal, said thrust ring being dimensioned and configured to support axial loads imposed upon said hub seal during installation; and c) an annular sleeve mounted coaxial with said annular casing, said annular sleeve including a deflector ring having structure which mechanically removes at least a portion of said thrust ring upon relative rotation of said annular casing and said annular sleeve to create a running clearance between said deflector ring and said thrust ring.

2. A hub seal as recited in claim 1, wherein said thrust ring is formed from a continuous ring of polymeric material.

3. A hub seal as recited in claim 1, wherein said deflector ring includes a circumferential machining surface extending generally parallel to said thrust ring.

4. A hub seal as recited in claim 1, wherein said deflector ring includes a plurality of circumferentially spaced apart tangentially extending flats formed in a radially outer portion thereof.

5. A hub seal as recited in claim 1, wherein said deflector ring includes a plurality of circumferentially spaced apart radially inwardly extending notches formed in a radially outer portion thereof.

6. A hub seal as recited in claim 1, wherein said circumferential retaining lip is angled radially outwardly to minimize running torque and direct movement of material mechanically removed from said thrust ring by said deflector ring in a radially outward direction.

7. A hub seal as recited in claim 1, wherein adhesive characteristics of the polymeric material from which said thrust ring is formed facilitates bonding of said thrust ring into said circumferential canal.

8. A hub seal as recited in claim 7, wherein said deflector ring is coated with a releasing material to prevent bonding of said thrust ring and said deflector ring.

9. A hub seal as recited in claim 7, wherein a circumferential lip projects axially into said circumferential canal to increase the bonding surface area thereof.

10. A hub seal as recited in claim 1, wherein said circumferential retaining lip is angled radially outwardly to minimize running torque and direct movement of material mechanically removed from said thrust ring by said deflector ring in a radially outward direction.

11. A hub seal for installation on the wheel end of a vehicle comprising:
   a) an annular casing defining a radially outer circumferential canal at outboard side thereof, and including a circumferential retaining lip which forms a radially inner wall of said circumferential canal;
   b) a thrust ring defined by a ring of polymeric material deposited within said circumferential canal, said thrust ring being dimensioned and configured to support axial loads imposed upon said hub seal during installation; and
   c) an annular sleeve mounted coaxial with said annular casing, said annular sleeve including a deflector ring opposing said outboard side of said annular casing, said deflector ring configured to mechanically remove a sufficient portion of said thrust ring upon relative rotation of said annular casing and said annular sleeve to create a minimal running clearance between said deflector ring and said thrust ring.

12. A hub seal as recited in claim 11, wherein said deflector ring includes a circumferential machining surface extending generally parallel to said thrust ring for mechanically removing at least a portion of said thrust ring.

13. A hub seal as recited in claim 11, wherein said deflector ring includes a plurality of circumferentially spaced apart tangentially extending flats formed in a radially outer portion thereof for mechanically removing at least a portion of said thrust ring.

14. A hub seal as recited in claim 11, wherein said deflector ring includes a plurality of circumferentially spaced apart radially inwardly extending notches formed in a radially outer portion thereof for mechanically removing at least a portion of said thrust ring.

15. A hub seal as recited in claim 11, wherein said retaining lip is angled radially outwardly to minimize running torque and direct movement of material mechanically removed from said thrust ring by said deflector ring in a radially outward direction.

16. A hub seal as recited in claim 11, wherein adhesive characteristics of the polymeric material from which said thrust ring is formed facilitates bonding of said thrust ring into said circumferential canal.

17. A hub seal as recited in claim 16, wherein said deflector ring is coated with a releasing material which prevents bonding of said thrust ring and said deflector ring.

18. A hub seal as recited in claim 11, wherein a circumferential lip projects axially into said circumferential canal to increase the bonding surface area thereof.

19. A method of fabricating a hub seal comprising the steps of:
   a) providing an annular casing defining a circumferential canal;
   b) depositing a polymeric material into said circumferential canal to form a machinable thrust ring;
   c) providing an annular sleeve having a deflector ring configured to mechanically remove at least a portion of said machinable thrust ring; and
   d) unitizing said annular casing and said annular sleeve so as to position said deflector ring in opposing relationship to said machinable thrust ring.

20. A method of fabricating a hub seal according to claim 19, wherein said step of depositing said polymeric material into said circumferential canal includes the step of facilitating bonding of said polymeric material within said canal.

21. A method of fabricating a hub seal according to claim 20, further comprising the step of coating said deflector ring with a releasing material which prevents bonding of said thrust ring and said deflector ring.

* * * * *